No. 633,693. Patented Sept. 26, 1899.
F. HACHMANN.
FEED BOX.
(Application filed Oct. 27, 1898.)
(No Model.)
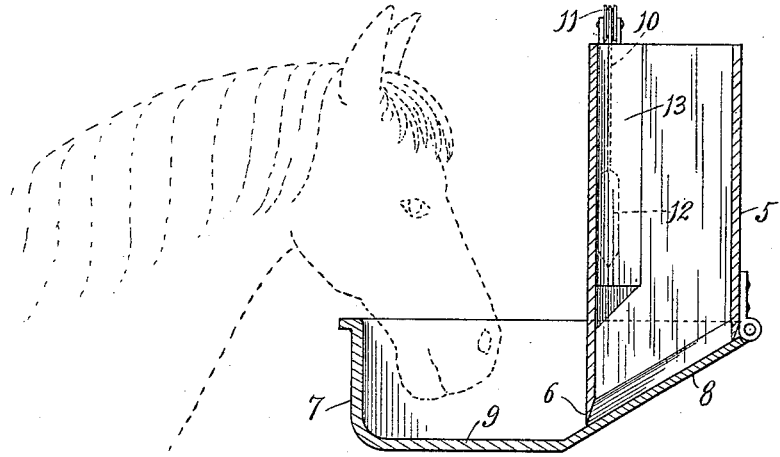
Fig. 1.
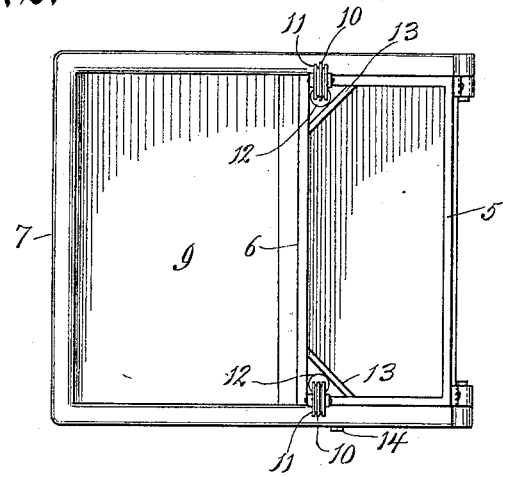
Fig. 2.
Fig. 3.
Fig. 4.
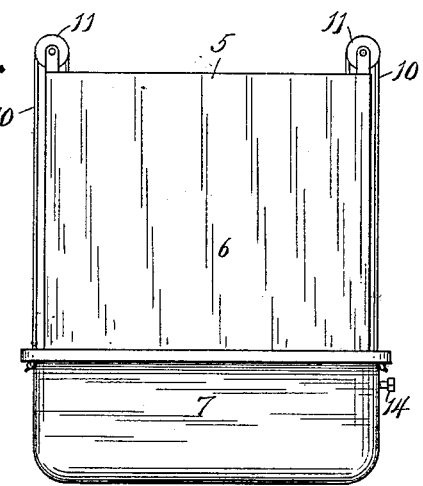
Witnesses.
David S. Rose
Anna V. Faust
Inventor.
Frederick Hachmann
By Benedict & Morsell
Attorneys.

UNITED STATES PATENT OFFICE.

FREDERICK HACHMANN, OF WHITEFISH BAY, WISCONSIN, ASSIGNOR TO HENRY M. BENJAMIN AND JOSEPH SCHRECK, OF MILWAUKEE, WISCONSIN.

FEED-BOX.

SPECIFICATION forming part of Letters Patent No. 633,693, dated September 26, 1899.

Application filed October 27, 1898. Serial No. 694,711. (No model.)

*To all whom it may concern:*

Be it known that I, FREDERICK HACHMANN, of Whitefish Bay, in the county of Milwaukee and State of Wisconsin, have invented a new and useful Improvement in Feed-Boxes, of which the following is a description, reference being had to the accompanying drawings, which are a part of this specification.

It is well known that when horses have the opportunity to eat freely from a mass of grain or ground food they are apt to take large mouthfuls and, swinging their heads around, to drop, and thereby lose, considerable amounts of grain or food.

The object of my invention is to provide improved means for supplying grain or meal or analogous food to a horse or other animal in a limited amount, thereby lessening the opportunity for the animal to obtain a large mouthful of the food and obviate the possibility of loss of the food in the manner indicated.

My invention consists of the apparatus, its parts, and combinations of parts, as hereinafter described and claimed, or their equivalents.

In the drawings, Figure 1 is a vertical section transversely from front to rear through my improved apparatus. Fig. 2 is a top plan view of the improved apparatus. Fig. 3 is a front elevation of the apparatus. Fig. 4 is a detail of the construction, showing the device for limiting the amount of the feed-box.

In the drawings, 5 is a vertically-disposed receptacle adapted for receiving at the top the supply of grain, ground meal, or analogous food intended for one feed to the animal using the apparatus. The lower end of this receptacle extends farther down at the front, as indicated at 6, than it does at the rear, the side walls terminating in an oblique line, and the receptacle is open at the bottom. The lower ends of the walls of this receptacle are also beveled off to a sharp or knife edge, so as to avoid catching grain or meal under them.

A box 7, open at the top, is provided with an inclined rear wall 8 and is hinged at the rear upper edge to the lower edge of the rear wall of the receptacle 5. The construction is such that when the box is in a substantially horizontal position, as shown in Fig. 1, the rear inclined wall 8 of the box fits against the lower extremity of the receptacle 5 and closes it, so that the grain or meal in the receptacle is not discharged into the front or main portion of the box. The box 7 projects in front of the receptacle 5, so that the main open body portion of the box is in front of the receptacle, and the bottom 9 of the box is preferably at a little lower plane than the lowest edge of the receptacle. In other words, it will be seen that the construction is preferably such that the inclined rear wall 8 extends downwardly toward the front, past the bottom of the longer front wall of the receptacle 5, and forms a chute down which grain may slide.

Two cords 10 10, attached to the upper edge of the box 7 about opposite the front wall of the receptacle 5, run over pulleys 11 11, mounted on the receptacle, and are provided with weights 12 12, adapted to support the box yieldingly in the position shown in Fig. 1, closing the lower end of the receptacle. The weights 12 12 and their lines of travel are inclosed in the front corners of the receptacle 5 by means of the partitions 13 13, fixed in the receptacle.

A pin 14, releasably inserted in any one of several holes 16 in the side wall of the receptacle and passing through an elongated slot 15 therefor in the side wall of the box, is adapted to limit the movement of the box vertically, and thereby also to regulate the extent of the opening that can be made between the bottom 8 of the box and the front wall 6 of the receptacle, thus also regulating the amount of grain or meal that can be delivered from the receptacle into the box at one time.

It will be understood that a supply of grain, as oats, being placed in the receptacle 5 will fall to the bottom thereof and will rest on the inclined wall 8 within the receptacle, and that thereupon a horse or animal, having learned the secret of the action of the feed-box, as animals will quickly do, will put its nose in the front part of the box and pressing down on the bottom will allow a small supply of grain to run down onto the bottom of the box past the front lower edge of the receptacle, which limited supply of food so in front of the box the animal can take up in its mouth, and as the quantity will not be great the animal will not secure so much as to not be able to hold it properly in its mouth for chewing.

What I claim as my invention is—

The combination with a vertically-disposed box-like receptacle having an open top and an open obliquely-terminating lower extremity the front wall being longer and extending below the rear wall, of a box hinged at its rear upper edge to the lower edge of the receptacle the box having an inclined rear wall fitting when the box is in a substantially horizontal position against the lower end of the receptacle and closing it the body of the box projecting and being mostly in front of the receptacle, counterbalancing-weights attached to the box adapted to support it yieldingly against the lower extremity of the receptacle, and means independent of the counterbalancing-weights for adjusting and limiting the movement of the feed-box.

In testimony whereof I affix my signature in presence of two witnesses.

FREDERICK HACHMANN.

Witnesses:
C. T. BENEDICT,
ANNA V. FAUST.